US010353971B2

(12) United States Patent
Shivaswamy

(10) Patent No.: US 10,353,971 B2
(45) Date of Patent: Jul. 16, 2019

(54) INCREASING CONTENT CIRCULATION IN A SOCIAL NETWORKING SERVICE

(71) Applicant: Microsoft Technology Licensing, LLC, Redmond, WA (US)

(72) Inventor: Pannagadatta K. Shivaswamy, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/131,276

(22) Filed: Apr. 18, 2016

(65) Prior Publication Data

US 2017/0286550 A1 Oct. 5, 2017

Related U.S. Application Data

(60) Provisional application No. 62/315,838, filed on Mar. 31, 2016.

(51) Int. Cl.
*G06F 17/30* (2006.01)
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC ............. G06F 17/30867; G06F 3/0481; G06F 16/9535; G06Q 50/01
See application file for complete search history.

(56) References Cited

U.S. PATENT DOCUMENTS 9,223,879 B2 * 12/2015 Narayanan .......... G06F 16/9535
2011/0191318 A1 * 8/2011 Gilbey ................ G06F 16/9535 707/706
2012/0030286 A1 * 2/2012 Tiu, Jr. .................... H04L 51/32 709/204
2014/0337436 A1 * 11/2014 Hoagland .............. H04L 51/16 709/204
2015/0244838 A1 * 8/2015 Tsui ....................... G06Q 30/02 709/203
2015/0278367 A1 * 10/2015 Chang ................ G06F 16/9535 707/723
2016/0232241 A1 * 8/2016 Stoyanov .......... G06F 17/30867
2017/0102862 A1 * 4/2017 Marra ................ G06F 16/9535

* cited by examiner

*Primary Examiner* — Huawen A Peng
(74) *Attorney, Agent, or Firm* — Schwegman Lundberg & Woessner, P.A.

(57) ABSTRACT

Aspects of the present disclosure relate to increasing content circulation in a social networking service. A server accesses a content item for a user. The server computes a utility value for a viral action on the content item by the user, the utility value being computed based on user characteristics of the user, content item characteristics of the content item, and information about first degree connections of the user. The server adjusts, based on the computed utility value for the viral action, a position of the content item in a feed for presentation to the user. The server provides for presentation of the feed, including the content item, to the user.

12 Claims, 6 Drawing Sheets

320
SERVER
PROCESSOR 405
410 NETWORK INTERFACE
415
MEMORY
420 FEED GENERATOR MODULE
425 CLICK UTILITY VALUE COMPUTATION MODULE
430 VIRAL ACTION UTILITY VALUE COMPUTATION MODULE

Figure 1:
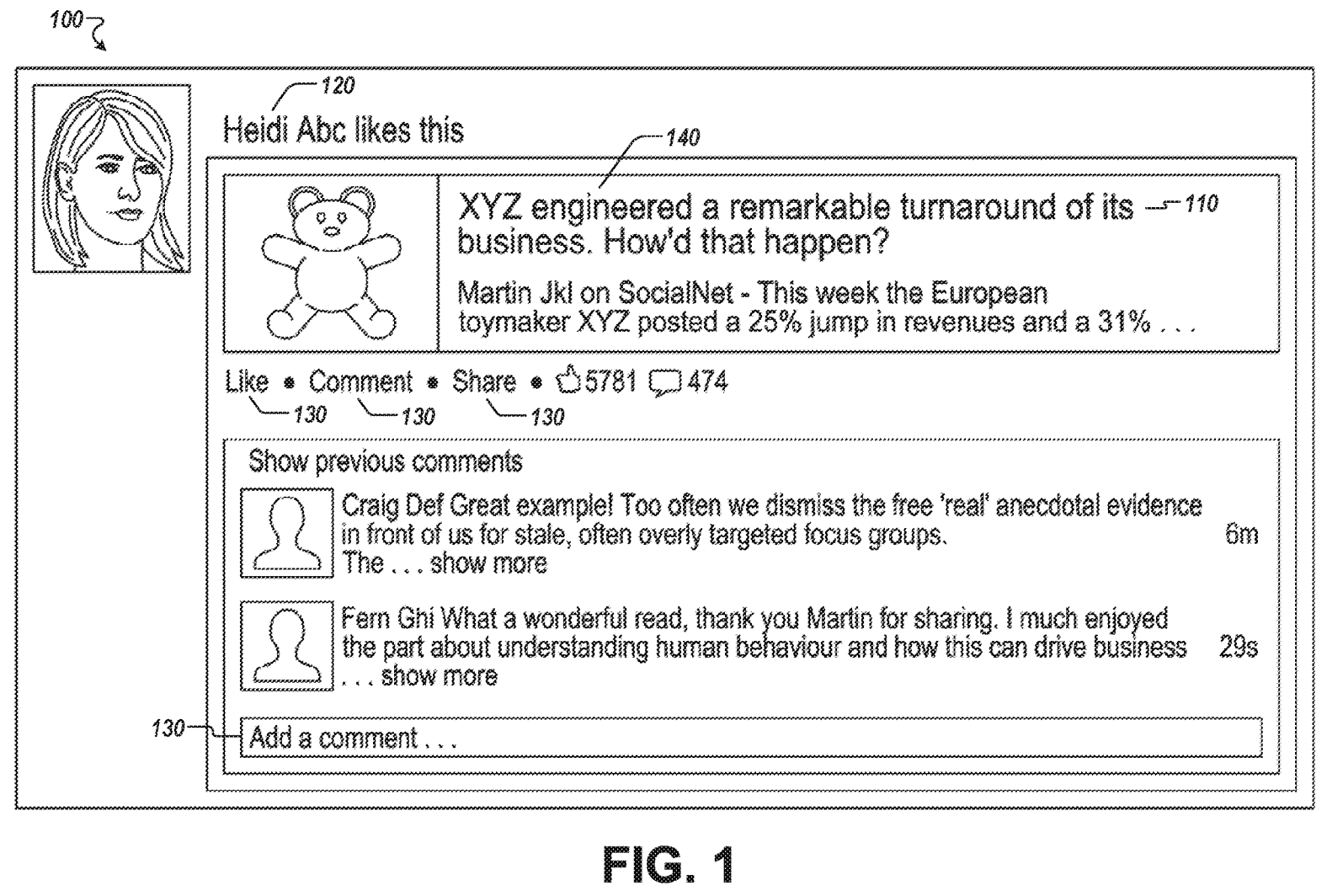

100

Heidi Abc likes this

120

XYZ engineered a remarkable turnaround of its business. How'd that happen?

110

140

Martin Jkl on SocialNet - This week the European toymaker XYZ posted a 25% jump in revenues and a 31% . . .

Like • Comment • Share • 5781 474

130

Show previous comments

Craig Def Great example! Too often we dismiss the free 'real' anecdotal evidence in front of us for stale, often overly targeted focus groups. The . . . show more 6m Fern Ghi What a wonderful read, thank you Martin for sharing. I much enjoyed the part about understanding human behaviour and how this can drive business . . . show more 29s Add a comment . . .

INCREASING CONTENT CIRCULATION IN A SOCIAL NETWORKING SERVICE

PRIORITY CLAIM

This application claims priority from U.S. Provisional Patent Application No. 62/315,838, filed on Mar. 31, 2016, and entitled "INCREASING CONTENT CIRCULATION IN A SOCIAL NETWORKING SERVICE," the entire disclosure of which is incorporated herein by reference.

TECHNICAL FIELD

The subject matter disclosed herein relates to social networking. In particular, example embodiments may relate to encouraging or increasing content circulation in a social networking service.

BACKGROUND

Upon accessing a social networking service via a computer, a user is presented with a feed. The feed includes content items, such as articles, photographs, videos, or text posted by various users of the social networking service, with which the user may interact. Typically, the feed is organized in a chronological order, with content items that were more recently added to the social networking service positioned closer to the top of the feed.

SUMMARY

In one aspect, the disclosed subject matter can be embodied in a method. The method includes accessing a content item for a user. The method includes computes a utility value for a viral action on the content item by the user, the utility value being computedbased on user characteristics of the user, content item characteristics of the content item, and information about first degree connections of the user. The method includes adjusting, based on the computed utility value for the viral action, a position of the content item in a feed for presentation to the user. The method includes providing for presentation of the feed, including the content item, to the user.

In one aspect, the disclosed subject matter can be embodied in a non-transitory computer-readable medium including instructions. The instructions include code for accessing a content item for a user. The instructions include code for computing a utility value for a viral action on the content item by the user, the utility value being computed based on user characteristics of the user, content item characteristics of the content item, and information about first degree connections of the user. The instructions include code for adjusting, based on the computed utility value for the viral action, a position of the content item in a feed for presentation to the user. The instructions include code for providing for presentation of the feed, including the content item, to the user.

In one aspect, the disclosed subject matter can be embodied in a system. The system includes one or more processors and a memory. The memory includes instructions for accessing a content item for a user. The memory includes instructions for computing a utility value for a viral action on the content item by the user, the utility value being computed based on user characteristics of the user, content item characteristics of the content item, and information about first degree connections of the user. The memory includes instructions for adjusting, based on the computed utility value for the viral action, a position of the content item in a feed for presentation to the user. The memory includes instructions for providing for presentation of the feed, including the content item, to the user.

As used herein, the phrase "viral action" encompasses its plain and ordinary meaning. A viral action may include, among other things, an indication for preference on a content item, a comment on the content item, a share of the content item, or any other action, related to the content item, that is shown to an additional user of the social networking service. A viral action may include any action that causes the content item to be circulated to users of the social networking service different from the user taking the action, for example, that user's contacts or "friends" in the social networking service. It should be noted that virality is defined in the Oxford Dictionary (2015) as "the tendency of an image, video, or piece of information to be circulated rapidly and widely from one Internet user to another."

BRIEF DESCRIPTION OF THE DRAWINGS

Various ones of the appended drawings merely illustrate example embodiments of the present inventive subject matter and cannot be considered as limiting its scope.

FIG. 1 is a diagram of an example of a portion of a feed in a social networking service.

DETAILED DESCRIPTION

Figure 2:
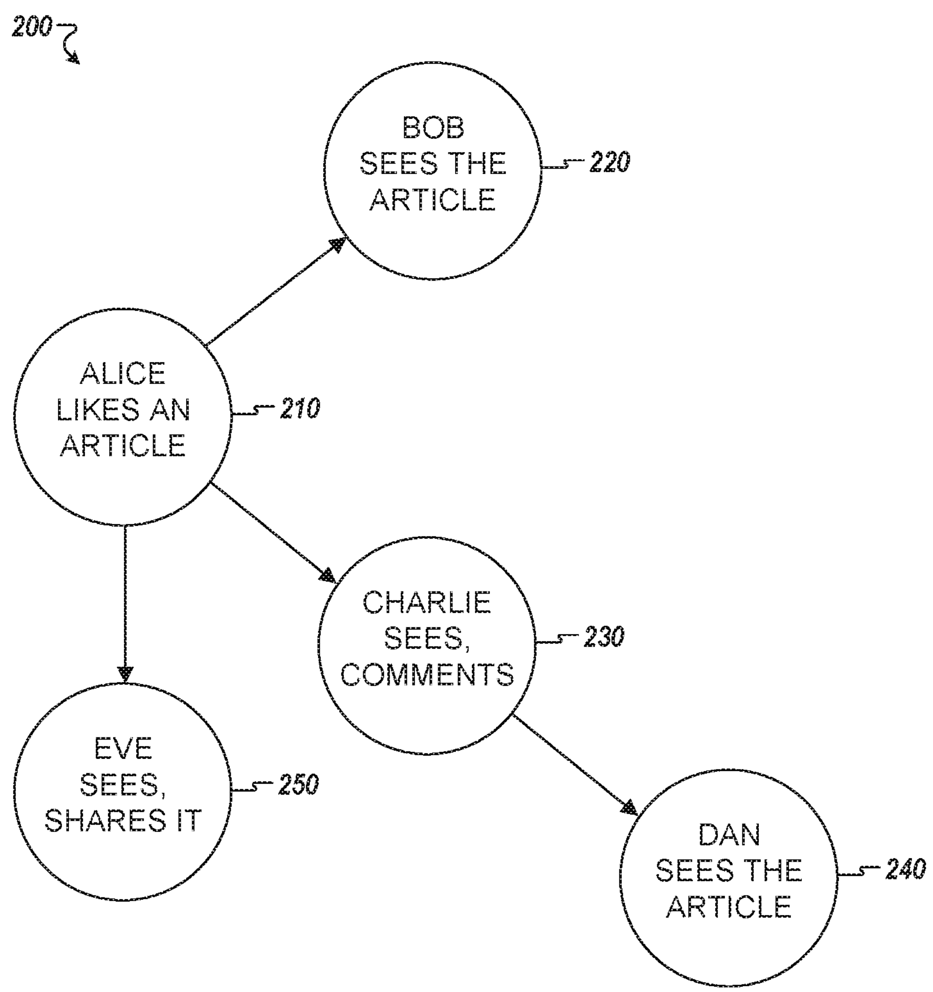
FIG. 2 is a diagram of an example flow of viral actions in a social networking service.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, in a social networking service, a feed that is presented to a user (e.g., upon accessing the social networking service via a web browser or mobile application) is typically organized in a chronological order, with content items that were more recently added to the social networking service positioned closer to the top of the feed. However, the chronological order may not optimize the user's engagement with the social networking service. Therefore, finding other approaches to ordering content items in the feed may be desirable.

In some cases, content items are arranged based on a computed utility value for the user to click a content item. For example, a social networking service may want to inspire a user who recently joined to click on content item(s) that would allow the user to connect with other users. The social networking service may want to inspire a user to access external articles and videos that are interesting to the user and that would engage the user with the social networking service.

Furthermore, in accordance with the subject technology, the social networking service may want to inspire a user to take a viral action (e.g., indication of preference, comment, or share) on a content item. The viral action provides utility to the social networking service because it increases the engagement of the user taking the viral action and, also, allows for content to be shared with other users of the social networking service. In this connection, a utility value for the viral action may depend, in part, on a number of first degree connections or followers that a user has. For example, the social networking service may be more interested in causing a celebrity with thousands of followers to re-share a video than in causing a new user with only three followers to re-share the video.

According to some implementations of the subject technology, upon determining that a social networking feed is to be presented to a user (e.g., in response to the user accessing the social networking service via a web browser or a mobile application), a server of a social networking service accesses a content item for the user. The content item may be provided (e.g., by one of the social connections of the user) for placing in the user's feed. The server computes a utility value for a viral action on the content item by the user, the utility value being computed based on user characteristics of the user, content item characteristics of the content item, and information about first degree connections of the user. The viral action includes, for example, an indication of preference (e.g., a "like") for the content item, a comment on the content item, or a re-sharing of the content item.

The user characteristics of the user include, for example, a job title of the user, an industry of the user, a geographic location of the user, an employer of the user, or an educational institution of the user. The content item characteristics of the content item include, for example, a media type of the content item, header information of the content item, uniform resource locator information of the content item or an original source that provided the content item to a social networking service. The information about the first degree connections of the user includes, for example, a number of the first degree connections and user characteristics of at least one of the first degree connections, a probability that a specified first degree connection will access a feed for presentation to the specified first degree connection within a threshold time period, or a frequency with which the specified first degree connection accesses the feed for presentation to the specified first degree connection.

The utility value for the viral action on the content item by the user measures how "useful" the viral action on the content item by the user is for the social networking service. The viral action may be useful to the social networking service, for example, in engaging the user and providing content to other users, such a first degree contacts or followers of the user. The utility value for the viral action on the content item by the user includes, for example, a downstream utility value and a user-self utility value. The downstream utility value is based on an impact of the viral action on first degree connections of the user. The user-self utility value is based on a benefit, to a social networking service, of increased engagement by the user.

In accordance with some implementations, the server adjusts, based on the computed utility value for the viral action, a position of the content item in the feed for presentation to the user. For example, content items having higher utility values for viral actions may be placed higher in the feed. The server provides for presentation of the feed, including the content item, to the user. For example, the server transmits the feed to a remote client device for presentation at the client device.

Some features of the subject technology include choosing a social networking service feed order in order to maximize downstream impact. Some features of the subject technology include optimizing not only for user interaction but also for feeds of first degree connections of the user. Some features of the subject technology include incentivizing a highly connected user (e.g., having more than a threshold number (e.g., 1,000 or 10,000) of first degree connections or followers) to share, since such sharing increases the feed inventory for other users. Some features of the subject technology include providing positive reinforcement for first time sharers or users who have not shared anything in a threshold time period (e.g., one week or one month) so that they may share again in the future (e.g., boost promotion of the share to get a reaction).

On a feed of a social networking service, many types of actions can be taken by a user with respect to a presented content item. Some of the actions (e.g., click) are only shown to the user taking the action. However, other actions (e.g., a viral action, such as an indication of preference, a comment, or a share) result in the content item on which the action is taken, as well as an indication of the action, being shown to other users who are connected to the user. As used herein, the phrase "viral action" encompasses its plain and ordinary meaning. A viral action may include, among other things, an indication for preference on a content item, a comment on the content item, a share of the content item, or any other action, related to the content item, that is shown to an additional user of the social networking service. A viral action may include any action that causes the content item to be circulated to users of the social networking service different from the user taking the action, for example, that user's contacts or "friends" in the social networking service. It should be noted that virality is defined in the Oxford Dictionary (2015) as "the tendency of an image, video, or piece of information to be circulated rapidly and widely from one Internet user to another."

FIG. 1 illustrates an example of a portion of a feed 100 in a social networking service that is presented to a user. The user is shown the content item 110 because one of the user's connections (Heidi ABC 120) liked the content item 110 in her feed. The user is provided with links 130 to take viral actions (e.g., like, comment, or share) the content item 110, and a link 140 to click (or otherwise select) to view a webpage for accessing more details about the content item 110, such as reading an article corresponding to the content item 110.

FIG. 2 illustrates an example flow 200 of viral actions in a social networking service. In the flow 200, Alice, Bob, Charlie, Dan, and Eve are users of the social networking service.

At block 210, Alice likes an article that is presented in her feed. In response to Alice's liking the article (or other viral action), at block 220, Bob sees the article. At block 230, Charlie sees the article and comments on it. At block 250, Eve sees the article. Bob, Charlie, and Eve are connected to Alice in the social networking service. In the example of FIG. 2, Alice's liking the article at block 210, caused three downstream impressions (at blocks 220, 230, and 250) of the article. Charlie and Eve both took viral actions (commenting and sharing) on the article. Thus, Alice's liking the article at block 210 caused two viral actions (at blocks 230 and 250).

In response to Charlie's comment of block 230, at block 240, Dan sees the article. Dan is connected to Charlie in the social networking service, and is not necessarily connected to Alice. According to some examples, Alice's liking the article is useful to the social networking service because this action allows Bob, Charlie, and Eve (and later Dan) to see and interact with the article.

Blocks 220, 230, and 250 are first-degree effects of Alice's liking the article at block 210. Block 240 is a second-degree effect of Alice's liking the article at block 210 because there is an additional block/action (block 230) between block 210 and block 240. According to some implementations of the subject technology, only first-degree effects of a viral action are taken into account in computing its utility. In these implementations, Dan's impression would not be taken into account in computing the utility of Alice's viral action.

According to other implementations, all effects of the viral action, regardless of the degree, are taken into account in computing its utility. According to yet other implementations, effects of first through nth degree of a viral action (where n is a positive integer) are taken into account.

The example of FIG. 2 is described in conjunction with an article. However, in some examples, any other content item, such as a photograph or a video, may be used in place of the article.

According to some implementations, a content item may be ranked (e.g., for placement in a feed) based in whole or in part on a utility value of the content item.

$$\text{Utility(content\_item)}=\alpha Pr[\text{Click}]+\beta Pr[\text{ViralAction}] \quad \text{Equation 1}$$

In Equation 1, $\alpha>0$ and $\beta>0$, and $\alpha$ and $\beta$ represent weights applied to a probability of a click (or other selection) of the content item and to a probability of a viral action on the content item, respectively. The term content_item represents a content item being presented in a feed. The probability of a click and the probability of a viral action are modelled, according to some aspects, using a logistic regression approach using historic data. In particular, the probability of a click given presentation of a content item in a user's feed is computed, in some examples, using Equation 2.

$$Pr[\text{click}|\text{content\_item}]=1/(1+\exp(-w_{\{ctr\}}\cdot x-b)) \quad \text{Equation 2}$$

In Equation 2, x represents features of a content item for a particular user. The value of x takes into account one or more of the following: an age of the content item, a type of the content item (e.g., article, video, photograph, profile update, etc.), the user's affinity for the update type, and the affinity between the user and another user who posted the update.

The value $w_{\{ctr\}}$ represents a weight vector that is learned from data of the social networking service using logistic regression, and b is a scalar called the bias term. The probability of a viral action given presentation of the content item in the user's feed is modelled using a technique similar to that of Equation 2. In some cases, $w_{\{ctr\}}$ is learned from the data using logistic regression. As used herein, the phrase "logistic regression," encompasses its plain and ordinary meaning. In some cases, logistic regression includes measuring the relationship between the categorical dependent variable and one or more independent variables by estimating probabilities using a logistic function, which is a cumulative logistic distribution.

According to some implementations of the subject technology, content items are ranked, for presentation in a feed, based on their utility. The utility is computed according to Equation 3.

$$\text{Utility(content\_item)} = \alpha\, Pr[\text{Click}] + \beta\, Pr[\text{There will be at least } k \text{ downstream clicks}] \quad \text{Equation 3}$$

In Equation 3, $\alpha>0$ and $\beta>0$, and $\alpha$ and $\beta$ represent weights applied to a probability of a click and at least k downstream clicks, respectively. The number of downstream clicks k is a preselected positive integer. It should be noted that the first term of Equation 3 is similar to that of Equation 1. However, in the second term, where Equation 1 takes into account the probability of a viral action, Equation 3 takes into account the probability that there will be at least k downstream clicks. A technique for computing the probability of at least k downstream clicks for a content item is presented in Equation 4.

$$Pr[\text{There will be at least } k \text{ downstream clicks}|\text{content\_item}]=1/(1+\exp(-w_{downStream}x-b)) \quad \text{Equation 4}$$

In Equation 4, x represents features of a content item for a particular user, similar to Equation 2. The value b is a scalar called the bias term. The value $w_{downStream}$ represents a downstream weight vector, similar to wart, of Equation 2.

In some cases, in addition to computing Pr [click|content_item] and Pr[ViralAction|content_item], the subject technology includes, in some aspects, features that capture the likelihood of a downstream action. For instance, as a network size (e.g., number of connections or followers, as discussed below) of a user increases, it becomes more likely that there will be k downstream actions responsive to a viral action by the user. Thus, in some aspects, the subject technology takes into account the bucketized network size of the user and interaction features between the activity type (e.g., like, comment, or share) and the network size of the user. As used herein, the phrase "bucketized network size," encompasses its plain and ordinary meaning. In some cases, a bucketized network size is a discretized version of the network size of a viewer. A machine determines whether the network size of a user is within one of multiple ranges (e.g. <27, 28-80, 81-167, etc.) and constructs features to indicate into which bucket this user falls. The value of k (as in the k downstream actions discussed above) may be determined using different approaches. In some examples, the value of k is fixed as k=1 or k=2.

By promoting, within a feed, content items that are likely to cause viral actions by the user and downstream viral actions, the social networking service can encourage more interactions and more engagement by its users. For viewers who are unlikely to have a large downstream impact (e.g., users with a small number of connections) the subject technology may encourage more clicks within their feed, and may not encourage viral actions as strongly.

Figure 3:
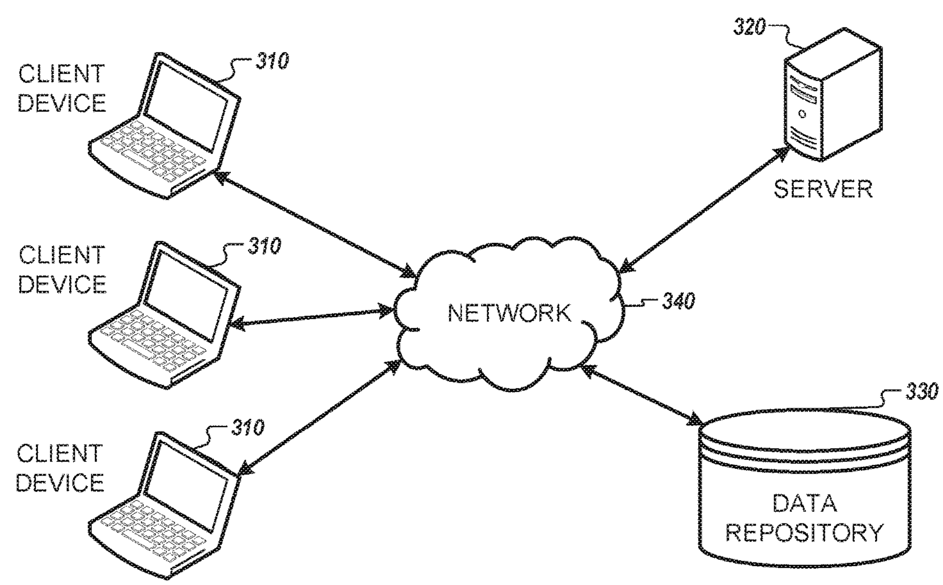
FIG. 3 is a diagram of an example system in which a social networking service may be implemented.

FIG. 3 is a diagram of an example system 300 in which a social networking service may be implemented. As shown, the system 300 includes client device(s) 310, a server 320, and a data repository 330 connected to one another via a network 340. The network 340 may include one or more of the Internet, an intranet, a local area network, a wide area network (WAN), a cellular network, a WiFi network, a virtual private network (VPN), a public network, a wired network, a wireless network, etc.

The client device(s) 310 may include one or more of a laptop computer, a desktop computer, a mobile phone, a tablet computer, a personal digital assistant (PDA), a digital music player, and the like. The client computing device 310 may include an application (or multiple applications), such as a web browser or a special purpose application, for communicating with the server 320 and the data repository 330. Using the application, a user of the client device 310, may access a feed in the social networking service. While three client devices 310 are illustrated in FIG. 3, the subject technology may be implemented with any number of client device(s) 310.

The server 320 stores data or instructions. The server 320 is programmed to provide the feed for presentation to a user at the client device 310. More details of the operation of the server 320 are provided in conjunction with FIG. 4 and FIG. 5.

The data repository 330 stores content items for presentation to a user within a feed. The content items may be received, at the data repository 330, from client device(s) 310 and may include photographs, videos, text, or links to external content (e.g., webpages or articles).

The data repository 330 also stores information about users of the social networking service and a social graph that represents connections between the users of the social networking service. More specifically, the data repository 330 stores user characteristics of users of the social networking service, content item characteristics of content items in the social networking service, and information about first degree connections of the users in the social networking service. The user characteristics include, for example, a job title of the user, an industry of the user, a geographic location of the user, an employer of the user, or an educational institution of the user. The content item characteristics of the content item(s) include, for example, a media type of the content item, header information of the content item, uniform resource locator information of the content item, or an original source that provided the content item to a social networking service. The information about first degree connection(s) of user(s) includes, for example, a number of the first degree connections and user characteristics of at least one of the first degree connections, a probability that a specified first degree connection will access a feed for presentation to the specified first degree connection within a threshold time period, or a frequency with which the specified first degree connection accesses the feed for presentation to the specified first degree connection.

In some implementations, the data repository 330 includes a social graph data repository, which is a particular type of data repository that uses graph structures with nodes, edges, and properties to represent and store data. Of course, with various alternative embodiments, any number of other entities might be included in the social graph, and as such, various other databases may be used to store data corresponding with other entities.

A user of a social networking service may register in the social networking service. Once registered, the user of the social network service may invite other users, or be invited by other users, to connect via the social network service. A "connection" may require a bi-lateral agreement by the users, such that both users acknowledge the establishment of the connection. Similarly, a user may elect to "follow" another user. In contrast to establishing a "connection," the concept of "following" another user typically is a unilateral operation, and at least with some embodiments, does not require acknowledgement or approval by the user who is being followed. When one user follows another, the user who is following may receive automatic notifications about various activities undertaken by the user being followed. In addition to following another user, a user may elect to follow a company, a topic, a conversation, or some other entity. For purposes of the present disclosure, the term "connection" shall include both the bi-lateral agreement by both users and the unilateral operation of "following." Each of the connections of a user may be included in a social graph data repository.

As used herein, in a social networking service with users A, B, and C, if A is connected to B and B is connected to C, but A is not connected to C, A and B may be referred to as "first-degree connections." A and C may be referred to as "second-degree connections." Third, fourth, and nth degree connections are similarly defined.

A social networking service may also provide a broad range of other applications and services that allow users the opportunity to share and receive information, often customized to the interests of the user. For example, a social networking service may include a photo sharing application that allows users to upload and share photos with other users. As such, at least with some embodiments, a photograph may be a property or entity included within a social graph. Users of a social networking service may be able to self-organize into groups, or interest groups, organized around a subject matter or topic of interest. Accordingly, the data for a group may be stored in data repository 330. When a user joins a group, his or her membership in the group will be reflected in the social graph data stored in the data repository 330. With some embodiments, users may subscribe to or join groups affiliated with one or more companies. For instance, with some embodiments, users of the social network service may indicate an affiliation with a company at which they are employed, such that news and events pertaining to the company are automatically communicated to the users. With some embodiments, users may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the data repository 330.

In the implementation of FIG. 3, the system 300 include a single data repository 330 and a single server 320. However, the subject technology may be implemented with multiple data repositories or multiple servers. Furthermore, as shown in FIG. 3, a single network 340 connects the client device(s) 310, the server 320, and the data repository 330. However, the subject technology may be implemented using multiple networks to connect the machines. Additionally, while the server 320 and the data repository 330 are illustrated as being distinct machines, in some examples, a single machine functions as both the server 320 and the data repository 330.

Figure 4:
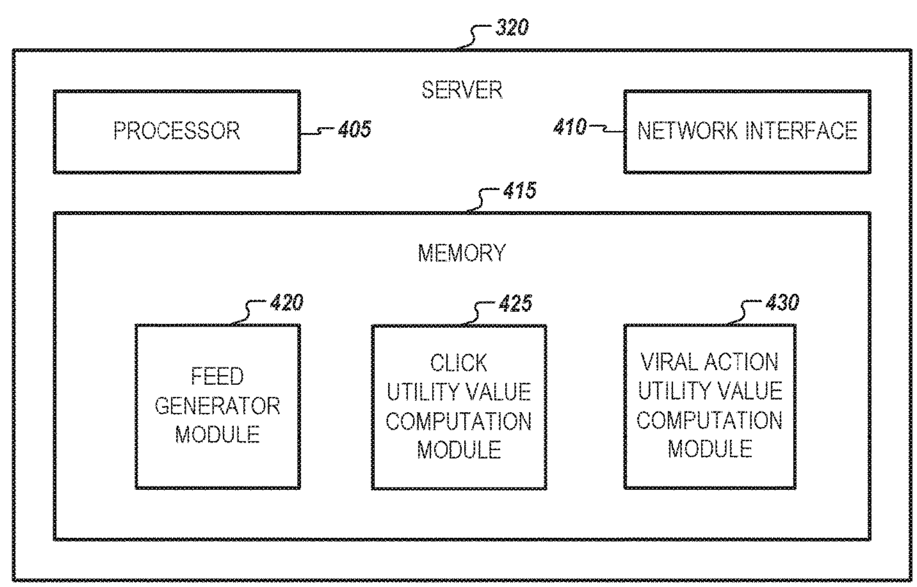
FIG. 4 is a block diagram of an example of the server of FIG. 3.

FIG. 4 is a block diagram of an example of the server 320 of FIG. 3. As shown, the server 320 includes a processor 405, a network interface 410, and a memory 415. The processor 405 executes machine instructions, which may be stored in the memory 415. While a single processor 405 is illustrated, the control server 320 may include multiple processors arranged into multiple processing units (e.g., central processing unit (CPU), graphics processing unit (GPU), etc.). The processor 405 includes one or more processors. The network interface 410 allows the control server 320 to send and receive data via the network 340. The network interface 410 includes one or more network interface cards (NICs). The memory 415 stores data or instructions. As shown, the memory 415 includes a feed generator module 420, a click utility value computation module 425, and a viral action utility value computation module 430.

The feed generator module 420 is configured to receive multiple content items for a user from the data repository 330 and to generate a feed that includes all or a portion of those content items. The feed generator module 420 may execute, for example, when a user of a client device 310 accesses the social networking service or requests to view the feed. The feed generator module 420 may access the click utility value computation module 425 or the viral action utility value computation module 430 to assist in ordering content items in the feed. In addition, according to some examples, chronology is considered in ordering content items in the feed.

The click utility value computation module 425 is configured to compute a utility value, to the social networking service, for a user clicking on a content item. The social networking service may benefit from users clicking on content items because such behavior increases user engagement and increases the likelihood that users will continue to use and engage with the social networking service. In some cases, the social networking service may particularly benefit from newer users or less active users clicking on content items, as those users are particularly prone to encouragement to become more engaged with the social networking service.

The viral action utility value computation module 430 is configured to compute a utility value, to the social networking service, for a user taking a viral action on a content item. The viral action may include an indication of preference for the content item, a comment on the content item, or a re-sharing of the content item. The social networking service may benefit from viral action because viral actions are presented to other users of the social networking service, such as first degree connections or followers of the user taking the viral action. In some cases, the social networking service may particularly benefit from viral actions by more established or celebrity users who have a larger number of connections or followers, as viral actions by those users are more likely to be seen by others and are more likely to cause further clicks or viral actions.

According to some aspects, the viral action utility value computation module 430 computes the viral action utility value based on a downstream utility value and a user-self utility value. The downstream utility value is based on an impact of the viral action on first degree connections of the user. For example, the viral action provides additional content and information that may be shared with the first degree connections and followers. In this connection, the downstream utility value of a viral action may be particularly valuable for celebrity users or users who have a large number (e.g., more than a threshold number, such as 1,000 or 2,000) of first degree connections or followers, as many additional users can have the viral actions of these users added to their feeds. The user-self utility value is based on a benefit, to a social networking service, of increased engagement by the user. For example, if a user takes viral actions, the user becomes more engaged with the social networking service and is more likely to continue accessing the social networking service. The user-self utility value may be used to, among other things, encourage new or inactive users to become more active by taking viral actions in the social networking service. For example, if the user takes a viral action and one of the user's first degree connections responds to the viral action, the user may become more involved and engaged with the social networking service. The viral action utility value may be computed similarly to how the content item utility value is computed, as discussed above in conjunction with Equations 1-4.

As used herein, the term "configured" encompasses its plain and ordinary meaning. A module (e.g., module 420, 425, or 430) may be configured to carry out operation(s) by storing code for the operation(s) in memory (e.g., memory 415). Processing hardware (e.g., processor 405) may carry out the operations by accessing the appropriate locations in the memory. Alternatively, the module may be configured to carry out the operation(s) by having the operation(s) hardwired in the processor.

Figure 5:
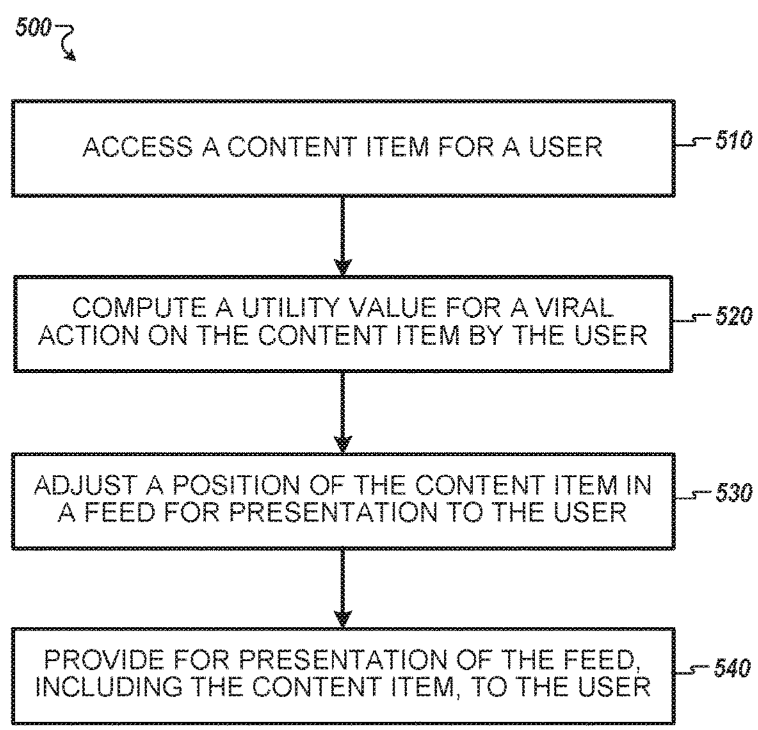
FIG. 5 is a flowchart illustrating a method for providing a feed for presentation to a user.

FIG. 5 is a flowchart illustrating a method 500 for providing a feed for presentation to a user. The method 500 may be implemented at the server 320 or any server associated with a social networking service.

The method 500 begins at step 510, where the server 320 accesses a content item for a user. The content item may reside in the data repository 330. The server 320 may access the content item upon determining that a feed is to be provided for the user. The feed may be provided, for example, in response to the user accessing a webpage or application associated with the social networking service at a client device 310. The server may access and process each content item for the user's feed using the techniques described herein.

At step 520, the server 320 computes a utility value, of the social networking service, for a viral action on the content item by the user. In some examples, the server computes the utility value for the viral action based on user characteristics of the user, content item characteristics of the content item, and information about first degree connections of the user. It should be noted that the utility value for the viral action is different from the utility of the content item. For example, the utility value for the viral action is computed according to Equation 6, discussed below. The utility value for the viral action on the content item by the user includes, for example, a downstream utility value and a user-self utility value. The downstream utility value is based on an impact of the viral action on first degree connections of the user. The user-self utility value is based on a benefit, to a social networking service, of increased engagement by the user.

According to some implementations, the information about the first degree connections of the user includes a number of the first degree connections and user characteristics of at least one of the first degree connections. According to some implementations, the information about the first degree connections of the user includes a probability that a specified first degree connection will access a feed for presentation to the specified first degree connection within a threshold time period, or a frequency with which the specified first degree connection accesses the feed for presentation to the specified first degree connection.

In some examples, the user characteristics of the user include a job title of the user, an industry of the user, a geographic location of the user, an employer of the user, or an educational institution of the user. The content item characteristics of the content item include a media type of the content item, header information of the content item, uniform resource locator information of the content item, or an original source that provided the content item to a social networking service.

At step 530, the server 320 adjusts, based on the computed utility value for the viral action, a position of the content item in the feed for presentation to the user. For example, if the computed utility value for the viral action is high, the content item may be placed higher in the feed. Other factors that are considered, in some implementations, in determining a position of the content item in the feed, include a timestamp associated with the content item (e.g., corresponding to a time when the content item was created or added to the social networking service) and a click utility value of the content item (which may be computed by the click utility value computation module 425). In some cases, positions of multiple content items in the feed are adjusted based on utility values for viral actions.

At step 540, the server 320 provides for presentation of the feed, including the content item, to the user. For example, the server 320 may transmit the feed, including the content item, over the network 340 to the client device 310 of the user. In some cases, the server receives, from the client device 310 of the user, an indication of a viral action on the content item by the user. In response to the viral action, the server provides the content item in a feed for presentation to at least one first degree connection of the user. After step 540, the method 500 ends.

According to some examples, content items within a feed may be ordered based on scores calculated according to Equation 5.

$$\text{Score}=\alpha*U(\text{Click})+\beta*U(\text{Viral\_Action}) \quad \text{Equation 5}$$

In Equation 5, Score represents the score of the content item, based on which the content item may be positioned in the feed. U(Click) is a utility function of a click, and U(Viral_Action) is a utility function of a viral action. It should be noted that, in some cases, the subject technology uses the utility of a click to be the same as the probability of a click. However, the utility of a viral action, in some cases, is not just the probability of the viral action, but it is determined based on the viral action as well as the downstream impact from the viral action. Instead, the utility function of the viral action is defined as set forth in Equation 6, and the utility function of the click is defined using a technique similar to that of Equation 6. As set forth in Equation 5, weighting factors $\alpha$ and $\beta$ are applied to the utility functions. In some cases, a multiplicative factor, based on the chronology, may be multiplied by the score of Equation 5 to determine the position of the content item in the feed.

The utility of the viral action, U(Viral_Action), may be calculated based on a probability of the user taking a viral action given that the user sees the content item in the feed or based on a probability of the user seeing the content item given its position in the feed. The utility of the viral action, U(Viral_Action), may be calculated by adding plural weighting factors multiplied by characteristics of the user, the user's first degree connections, or the content item, for example, as set forth in Equation 6.

$$U(\text{Viral\_Action})=1/(1+e\hat{\ }(-\Sigma(w_i*x_i))) \quad \text{Equation 6}$$

In Equation 6, U(Viral_Action) is the utility function of a viral action. The constant e is Euler's number, which is approximately 2.71828. As set forth in Equation 6, the weighting factor $w_i$ is multiplied by a value of a characteristic $x_i$, which may be a characteristic of the user, the user's first degree connections, the content item, or two or more of the above. Characteristics of the user include, for example, a job title of the user, an industry of the user, a geographic location of the user, an employer of the user, or an educational institution of the user. Characteristics of the user's connections include similar types of information to the characteristics of the user. Characteristics of the content item include, for example, a media type of the content item, header information of the content item, uniform resource locator information of the content item, or an original source that provided the content item to a social networking service.

Figure 6:
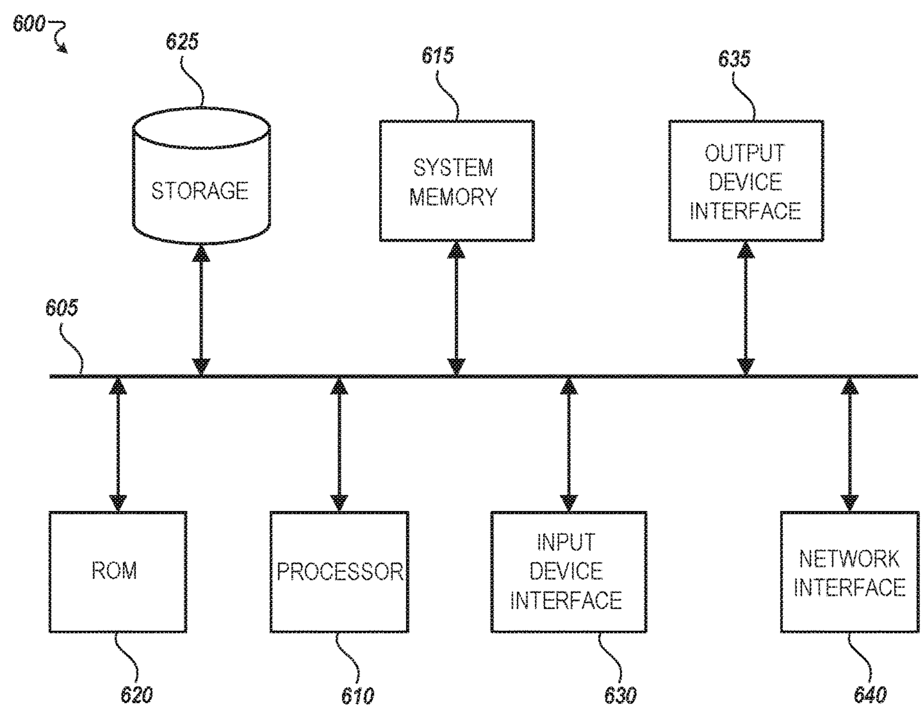
FIG. 6 conceptually illustrates an example electronic system with which some implementations of the subject technology can be implemented.

FIG. 6 conceptually illustrates an electronic system 600 with which some implementations of the subject technology are implemented. For example, one or more of the client device 310, the server 320, or the data repository 330 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processor(s) 610, a system memory 615, a read-only memory (ROM) 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processor(s) 610 with the ROM 620, the system memory 615, and the permanent storage device 625.

From these various memory units, the processor(s) 610 retrieves instructions to execute and data to process in order to execute the processes of the subject technology. The processor(s) can include a single processor or a multi-core processor in different implementations.

The ROM 620 stores static data and instructions that are needed by the processor(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example, a magnetic or optical disk and its corresponding disk drive) as the permanent storage device 625. Other implementations use a removable storage device (for example a floppy disk, flash drive, and its corresponding disk drive) as the permanent storage device 625.

Like the permanent storage device 625, the system memory 615 is a read-and-write memory device. However, unlike storage device 625, the system memory 615 is a volatile read-and-write memory, such as a random access memory (RAM). The system memory 615 stores some of the instructions and data that the processor needs at runtime. In some implementations, the processes of the subject technology are stored in the system memory 615, the permanent storage device 625, or the ROM 620. For example, the various memory units include instructions for increasing content circulation in a social networking service in accordance with some implementations. From these various memory units, the processor(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interface 635 enables, for example, the display of images generated by the electronic system 600. Output devices used with output device interface 635 include, for example, printers and display devices, for example cathode ray tubes (CRT) or liquid crystal displays (LCD). Some implementations include devices, for example, a touch screen, that function as both input and output devices.

Finally, as shown in FIG. 6, bus 605 also couples electronic system 600 to a network (not shown) through a network interface 640. In this manner, the electronic system 600 can be a part of a network of computers (for example, a local area network (LAN), a WAN, or an Intranet), or a network of networks (for example, the Internet). Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, compact disk read-only memories (CD-ROMs), flash drives, RAM chips, hard drives, erasable programmable read-only memories (EPROMs), and the like. The computer readable media does not include carrier waves and electronic signals passing wirelessly or over wired connections.

In this specification, the term "software" is meant to include firmware residing in ROM or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, CD-ROM, recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., secure digital (SD) cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processor and includes sets of instructions for performing various operations. Examples of computer programs or computer code include machine code (for example, produced by a compiler) and files including higher-level code that are executed by a computer, an electronic component, or a microprocessor using an interpreter.

While the above discussion primarily refers to microprocessors or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. For the purposes of the specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user (for example, by sending web pages to a web browser on a user's client device in response to requests received from the web browser).

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., a hypertext markup language (HTML) page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be implemented. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect," does not imply that the aspect is essential to the subject technology or that the aspect applies to all configurations of the subject technology. A disclosure relating to an aspect may apply to all configurations, or one or more configurations. A phrase, for example, an aspect, may refer to one or more aspects and vice versa. A phrase, for example, a "configuration," does not imply that such configuration is essential to the subject technology or that such configuration applies to all configurations of the subject technology. A disclosure relating to a configuration may apply to all configurations, or one or more configurations. A phrase, for example, a configuration, may refer to one or more configurations and vice versa.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:

accessing a content item eligible for presentation to a user;

computing a utility value for the content item, the utility value representing, in part, a predictive measure of the likelihood that first degree connections of the user will perform one of a plurality of viral actions with respect to the content item, the utility value being computed based, in part, on information about first degree connections of the user, the information about the first degree connections of the user comprising i) the number of first degree connections of the user, ii) a predictive measure of likelihood that first degree connections of the user will access a feed presenting the content item within a threshold time period, and, iii) a predictive measure of frequency with which the first degree connections of the user will access a feed presenting the content item, wherein the viral actions comprise: an indication of preference for the content item, a comment on the content item, and, a re-sharing of the content item;

adjusting, based on the computed utility value for the content item, a position of the content item in a feed for presentation to the user; and providing for presentation of the feed, including the content item, to the user.

2. The method of claim 1, wherein the utility value for the content item comprises, in part, a user-self utility value, wherein the user-self utility value is based on a benefit, to a social networking service, of increased engagement by the user.

3. The method of claim 1, wherein the utility value is computed based, in part, on user characteristics of the user, the user characteristics comprising: a job title of the user, an industry of the user, a geographic location of the user, an employer of the user, or an educational institution of the user.

4. The method of claim 1, wherein the utility value is computed based, in part, on content item characteristics of the content item, the content characteristics comprising: a media type of the content item, header information of the content item, uniform resource locator information of the content item, or an original source that provided the content item to a social networking service.

5. The method of claim 1, further comprising:

receiving an indication of a viral action on the content item by the user; and providing, in response to the viral action, the content item in a feed for presentation to at least one first degree connection of the user.

6. The method of claim 1, wherein the content item is accessed for presentation, within the feed, to the user, and wherein positions of multiple content items in the feed are adjusted based on utility values for viral actions.

7. A non-transitory machine-readable medium comprising instructions which, when executed by one or more processors of a machine, cause the machine to perform operations comprising:

accessing a content item eligible for presentation to a user;

computing a utility value for the content item, the utility value representing, in part, a predictive measure of the likelihood that first degree connections of the user will perform one of a plurality of viral actions with respect to the content item, the utility value being computed based, in part, on information about first degree connections of the user, the information about the first degree connections of the user comprising i) the number of first degree connections of the user, ii) a predictive measure of likelihood that first degree connections of the user will access a feed presenting the content item within a threshold time period, and, iii) a predictive measure of frequency with which the first degree connections of the user will access a feed presenting the content item, wherein the viral actions comprise: an indication of preference for the content item, a comment on the content item, and, a re-sharing of the content item;

adjusting, based on the computed utility value for the content item, a position of the content item in a feed for presentation to the user; and providing for presentation of the feed, including the content item, to the user.

8. The machine-readable medium of claim 7, wherein the utility value for the content item comprises a user-self utility value, wherein the user-self utility value is based on a benefit, to a social networking service, of increased engagement by the user.

9. The machine-readable medium of claim 7, wherein the utility value is computed based, in part, on user characteristics of the user, the user characteristics comprising: a job title of the user, an industry of the user, a geographic location of the user, an employer of the user, or an educational institution of the user.

10. The machine-readable medium of claim 7, wherein the utility value is computed based, in part, on content item characteristics of the content item, the content characteristics comprising: a media type of the content item, header information of the content item, uniform resource locator information of the content item or an original source that provide the content item to a social networking service.

11. A system comprising:

one or more processors; and a memory comprising instructions which, when executed by the one or more processors, cause the one or more processors to perform operations comprising:

accessing a content item for a user;

computing a utility value for the content item, the utility value representing, in part, a predictive measure of the likelihood that first degree connections of the user will perform one of a plurality of viral actions with respect to the content item, the utility value being computed based, in part, on information about first degree connections of the user, the information about the first degree connections of the user comprising i) the number of first degree connections of the user, ii) a predictive measure of likelihood that first degree connections of the user will access a feed presenting the content item within a threshold time period, and, iii) a predictive measure of frequency with which the first degree connections of the user will access a feed presenting the content item, wherein the viral actions comprise: an indication of preference for the content item, a comment on the content item, and, a re-sharing of the content item;

adjusting, based on the computed utility value for the content item, a position of the content item in a feed for presentation to the user; and providing for presentation of the feed, including the content item, to the user.

12. The system of claim 11, wherein the utility value for the content item comprises a user-self utility value, wherein the user-self utility value is based on a benefit, to a social networking service, of increased engagement by the user.

* * * * *